United States Patent [19]

Sikkenga et al.

[11] Patent Number: 4,999,326

[45] Date of Patent: Mar. 12, 1991

[54] PALLADIUM CATALYST REACTIVATION

[75] Inventors: David L. Sikkenga; Ian C. Zaenger, both of Wheaton, Ill.; Gregory S. Williams, Tampa, Fla.

[73] Assignee: Amoco Corporation, Chicago, Ill.

[21] Appl. No.: 539,619

[22] Filed: Jun. 18, 1990

[51] Int. Cl.[5] .................... B01J 23/96; B01J 38/54; B01J 38/52; C07C 5/367
[52] U.S. Cl. .................... 502/30; 502/29; 502/32; 502/33; 585/411
[58] Field of Search .............. 502/33, 32, 30, 29, 502/28, 26, 22; 585/411, 434

[56] References Cited

U.S. PATENT DOCUMENTS

| | | | |
|---|---|---|---|
| 2,784,238 | 8/1957 | Jacobs et al. | 502/33 |
| 2,819,326 | 1/1958 | Mills | 502/33 |
| 4,950,825 | 8/1990 | Sikkenga et al. | 585/411 |

*Primary Examiner*—Paul E. Konopka
*Attorney, Agent, or Firm*—James R. Henes; William H. Magidson; Ralph C. Medhurst

[57] ABSTRACT

A reactivation process for a deactivated supported palladium catalyst involves contacting the catalyst with an organic polar solvent for naphthalenic compounds at a temperature below about 200° C. The organic polar solvent has a dielectric constant at 25° C. in the range of about 4 to about 80 and has a boiling point at atmospheric pressure in the range of about 30° C. to about 230° C. Preferred organic polar solvents are acetone and methanol, as well as mixtures thereof.

17 Claims, 1 Drawing Sheet

4,999,326

PALLADIUM CATALYST REACTIVATION

FIELD OF THE INVENTION

This invention relates to a process for reactivating a deactivated palladium-containing catalyst by contacting the catalyst with an organic polar solvent.

BACKGROUND OF THE INVENTION

Palladium-containing catalysts, particularly heterogeneous catalysts wherein the palladium is supported on carbon, alumina, or the like, have been used as the catalyst in a number of chemical processes, especially processes involving the conversion of hydrocarbons at a temperature below about 400° C.

Recently, such a catalyst has been found to be highly active and selective for the dehydrogenation of dimethyltetrahydronaphthalenes to dimethylnaphthalenes under liquid phase elevated temperature conditions. However, in such a process, the catalyst activity unfortunately declines significantly after several uses.

Normal regeneration procedures for fixed bed catalysts, such as supported heterogeneous catalysts, call for elevated temperature heating to remove the deactivating species by oxidation. However, palladium is known to sinter at the elevated temperatures typically used for such a heating which are about 400° to about 500° C. Thus, such a heating results in permanent damage to the catalyst and resultant reduced catalytic activity.

A palladium-containing catalyst is expensive. When it is deactivated, it is typically returned to the manufacturer to recover the palladium, which is also an expensive process. The art of redispersing palladium on a heat-treated supported palladium catalyst has not been developed.

Thus, problems with deactivation in use and in reactivation tend to retard the usability and acceptance for commercial purposes of palladium containing catalysts.

A new and improved method for regenerating a deactivated palladium containing catalyst would be desirable. The present invention provides such a method.

SUMMARY OF THE INVENTION

The present method for reactivating or regenerating a deactivated supported palladium catalyst involves contacting such catalyst with an organic polar solvent for naphthalenic compounds at a temperature below about 200° C. This solvent exhibits a dielectric constant at 25° C. in the range of about 4 to about 80 and has a boiling point at atmospheric pressure in the range of about 30° C. to about 230° C. Reactivation is achieved without attendant heating of the catalyst to an elevated temperature, thereby avoiding any sintering of the palladium present.

The method of this invention is well suited for the treatment of a heterogeneous palladium dehydrogenation catalyst also while the catalyst is in place in a reactor as a fixed bed Thus, the presently contemplated reactivation can be used in sequential combination with a palladium-catalyzed conversion of hydrocarbons.

In a presently preferred process mode, dimethyltetrahydronaphthalene (DMT) is first dehydrogenated to dimethylnaphthalene in a liquid phase and in the presence of a supported palladium dehydrogenation catalyst until the catalyst becomes deactivated to a predetermined degree, after which such catalyst is reactivated by treatment with the organic polar solvent as provided herein.

Presently preferred polar solvents are $C_3$ to $C_{10}$ aliphatic ketones and $C_1$ to $C_{10}$ aliphatic monohydric alcohols. Most preferred such polar organic solvents are acetone and methanol, as well as mixtures thereof. Combinations of the aforementioned solvents can also be utilized for this purpose. Other suitable solvents are aliphatic and aromatic ethers, carboxylic acid esters, as well as halogenated hydrocarbons having the aforesaid polarity.

Various other features, advantages, aims, purposes, embodiments, and the like of this invention will be apparent to those skilled in the art from the present specification and appended claims.

DETAILED DESCRIPTION

Figure 1:
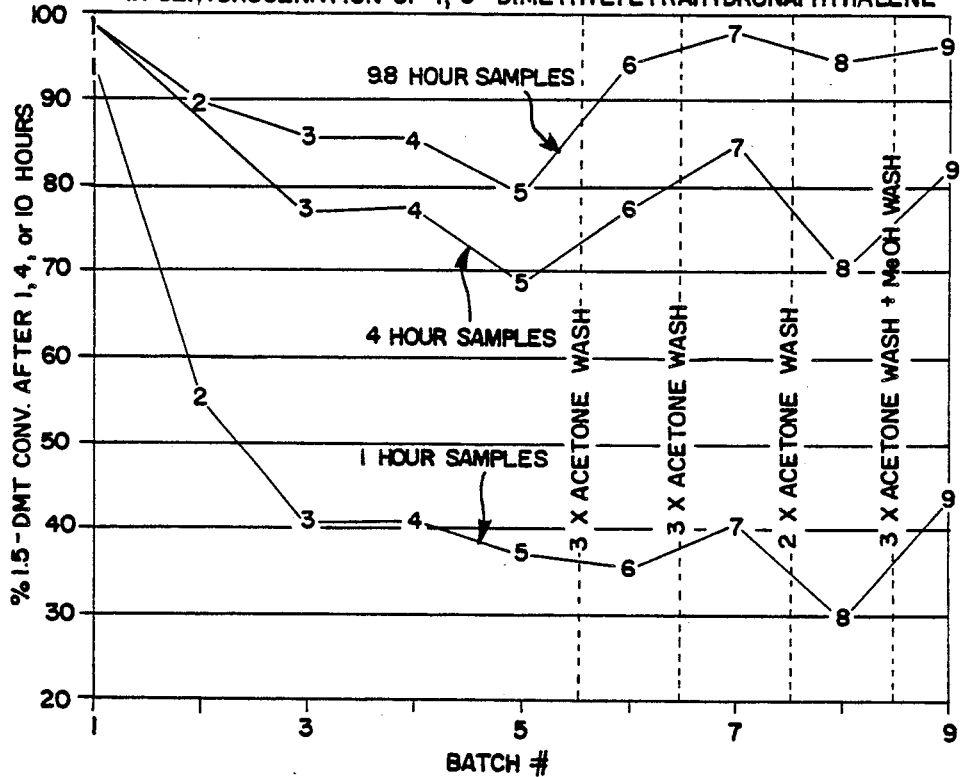
FIG. 1 is a graphical representation of four consecutive acetone regenerations of a 5-weight percent palladium catalyst supported on carbon and used to dehydrogenate batches of 1,5- dimethyltetrahydronaphthalene to 1,5-dimethylnaphthalene.

The method contemplated by this invention is particularly well suited for the reactivation of dehydrogenation catalysts. Such catalysts comprise, in combination, palladium as the active catalytic substance and a support therefor. Such catalysts and methods for their manufacture are known to the prior art. Typical support materials for the catalyst are gamma-alumina, silica gel, and the like.

The catalysts used for dehydrogenation usually contain about 0.1 to about 30 weight percent palladium on a total catalyst weight basis, although smaller and larger amounts of palladium may be present.

When a palladium-containing catalyst such as above characterized is used to catalyze the conversion of hydrocarbons, usually at temperatures below about 40020 C., the catalyst slowly deactivates. A reduction in catalytic activity with time is observed as the catalyst is used. Such reduction in activity is believed to be caused by the coating of catalyst particles in whole or in part by contaminants, or by a change in the physical structure of the catalyst particles, or both.

Conventional regeneration of supported palladium catalysts entails a burn to oxidize the catalyst deactivating species at elevated temperatures, usually in the range of about 400 to 500° C. However, palladium sinters at such temperatures. Thus, conventional regeneration procedures of these catalysts can result in permanent catalyst damage as well as reduced activity.

In the case of the dehydrogenation of, for example, di(lower alkyl)tetrahydronaphthalenes to di(lower alkyl)naphthalenes, and, specifically, of dimethyltetrahydronaphthalenes (DMT) to dimethylnaphthalenes, under liquid phase conditions at a temperature in the range of about 20020 C. to about 350° C. and using a palladium-containing catalyst as described herein, the catalyst activity declines relatively significantly in a relatively short time period regardless of whether the dehydrogenation is accomplished by batch, continuous, or semi-continuous processing. Some loss in activity is observed even after catalyst usage in a single batch. Moreover, after one to three weeks of catalyst usage on stream in a continuous, fixed-bed dehydrogenation process the catalyst was found to have become severely deactivated.

Initially, the palladium-containing catalyst activity in such a dehydrogenation of dimethyltetrahydronaphthalenes is characteristically very high and very selective. For example, and as illustrated by Example 1 below, the catalyst activity is such that over 98 percent conversion of dimethyltetrahydronaphthalenes to dimethylnaphthalenes is achieved in the first batch, but only an 89.7 percent conversion was obtained in the next succeeding batch. The decline in catalytic activity continued in succeeding batches so that, in the fifth batch, the conversion obtained was only 79.4 percent.

To reactivate such a deactivated supported palladium catalyst in accord with the present invention, the catalyst is treated with a polar organic solvent for naphthalenic compounds at a temperature below about 200° C. The treatment includes intimate contacting of the catalyst with the solvent which can be carried out batchwise, continuously, or semi-continuously. A preferred treatment temperature is in the range of about 20° C. to about 150° C. The contacting is continued for a time period sufficient to dissolve at least a portion of the deactivating components present on the catalyst particles, usually for about 10 to about 100 minutes depending upon the amount of solvent utilized.

By the term "polar organic solvent" as used herein, reference is had to a liquid comprised of carbon, hydrogen, oxygen, and optionally halogen, and in whose molecules there is either a permanent separation of positive and negative charges, or the centers of positive and negative charges do not coincide. Such a polar solvent characteristically has a dielectric constant $\epsilon$ at 25° C. in the range of about 4 to about 80, a boiling point of about 3020 C. to about 230° C. at atmospheric pressure, is chemically active, and forms coordinate covalent bonds. Preferably the contemplated reactivation solvents are constituted solely by carbon, hydrogen, and oxygen, exhibit a dielectric constant at 25° C. in the range of about 10 to about 40, and have a boiling point at atmospheric pressure in the range of about 30° C. to about 150° C.

Sulfur or nitrogen containing solvents, even though polar in nature, are to be avoided since they can poison the catalyst.

Polar solvent compounds chosen for use in the practice of this invention are non-reactive and inert towards the palladium-containing catalyst. Typically such a polar solvent contains no more than about 12 carbon atoms per molecule. Suitable polar solvents include alcohols, ketones, ethers, aldehydes, and the like. Presently preferred classes of such polar solvents are monohydric $C_1$ to $C_{10}$ aliphatic alcohols and $C_3$ to $C_{10}$ aliphatic ketones. Presently most preferred such polar organic solvents are lower, i.e., $C_1$ to $C_4$, alkanols and lower symmetrical dialkanones. Mixtures of such aliphatic alkanols and such aliphatic ketones are also suitable. Presently preferred such mixtures have a weight ratio of alcohol to ketone in the range of about 5:1 to about 1:5.

Illustrative monohydric aliphatic alcohols suitable as solvents for the purposes of the present invention are methanol, ethanol, propanol, isopropanol, butanol, isobutanol, sec.-butyl alcohol and tert.-butyl alcohol.

Illustrative aliphatic ketones suitable for the present purposes are acetone, methylethyl ketone, diethyl ketone, cyclohexanone, methylisobutyl ketone, and the like.

Other suitable organic polar solvents for the present purposes are ethers, carboxylic acid esters, and halogenated hydrocarbons having the aforementioned degree of polarity.

Illustrative ethers are the aliphatic open chain ethers, e.g., ethylvinyl ether, diethylether, butylvinyl ether, bis(2-methoxyethyl)ether, and the like, the aliphatic cyclic ethers, e.g., propylene oxide, 1,2-epoxybutane, tetrahydrofuran, tetrahydropyran, and the like, and the aromatic ethers, e.g., benzylethyl ether, ethoxybenzene, amisole, and the like.

Illustrative esters are the esters of saturated aliphatic monocarboxylic acids, e.g., methyl formate, ethyl formate, methyl acetate, ethylene glycol diacetate, and the like, the esters of aromatic monocarboxylic acids, e.g., methyl benzoate, ethyl benzoate, and the like, the lactones, e.g., oammabutyrolactone, and the like, the esters of dicarboxylic acids, e.g., ethyl malonate, ethyl maleate, and the like.

Illustrative halogenated hydrocarbons are the fluorinated hydrocarbons such as the aromatic fluorinated hydrocarbons, e.g., fluorobenzene, o-fluorotoluene, p-fluorotoluene, and the like, the chlorinated hydrocarbons such as the aliphatic monochlorinated hydrocarbons, e.g., 1-chloropropane, 1-chlorobutane, 1-chloropentane, and the like, the aromatic chlorinated hydrocarbons, e.g., chlorobenzene, and the like, the aliphatic polychlorinated hydrocarbons, e.g., dichloromethane, chloroform, 1,1-dichloroethane, 1,1,2,2-tetrachloroethane, and the like, the aromatic polychlorinated hydrocarbons, e.g., o-dichlorobenzene, m-dichlorobenzene, and the like.

The reactivation process of this invention can be practiced in any convenient environment or mode. However, it is commonly advantageous to practice this invention by maintaining the deactivated catalyst to be treated in the reactor wherein the catalyst was previously used for catalysis. Such a mode of operation avoids the time and labor and possible safety hazards of removing such catalyst from the reactor to a separate vessel for reactivation followed thereafter by drying and replacing such catalyst in the reactor along with some new catalyst material to make up for the inherent loss and breakage of original catalyst in such transfer steps.

In reactivating a catalyst in a reactor, the catalyst therein is first cooled down from its catalytic conversion temperature to a temperature below about 200° C., and more preferably below the boiling temperature of the solvent. Thereafter, the reactor is charged with the selected polar organic solvent.

The volume of polar solvent charged can vary widely, but a present preference is to employ a polar solvent volume per unit bulk volume of the catalyst which is in the range of about 2 to about 100. More preferably, such polar solvent volume is in the range of about 5 to about 25.

While the polar solvent contacts the catalyst to be reactivated, the reactor is maintained at the desired temperature below about 20020 C. Temperature control during reactivation can be effectively achieved by selecting as solvent an organic polar liquid that has a boiling point below about 20020 C. at the contemplated pressure. Autogenous pressures and reflux conditions can then be used during reactivation. Concurrently the reactor is preferably sparged with an inert gas, e.g., nitrogen. The sparging aids in achieving a flushing action by the polar solvent relative to the catalyst.

Refluxing with concurrent heating can be continued for a relatively short period of time, a present preference being a time period in the range of about 5 to about 30 minutes.

Thereafter, the reactor is depressurized and also cooled. The polar solvent is then separated from the catalyst, conveniently by draining, pumping, or the like, to complete one cycle of such reactivation.

This cycle can be repeated as desired to achieve the desired degree of reactivation. Usually, this cycle is repeated at least once, and preferably twice. Preferably, an aliquot of fresh or redistilled solvent is used for each such reactivation cycle.

Upon completion of the desired number of reactivation cycles, the reactivated catalyst is dried. Drying is conveniently and preferably accomplished by heating the catalyst to a temperature sufficient to drive off the solvent but below the palladium sintering temperature. Usually the drying temperature is in the range of about 50° to about 150° C. Concurrent purging of the reactor with an inert gas, preferably nitrogen, during the drying step is desirable. However, relatively higher and relatively lower drying temperatures can be employed, with or without purging. Reduced pressure may be used to facilitate solvent removal.

Whether or not a catalyzed dehydrogenation reaction is carried out continuously or in a series of successive batches, it is presently preferred for costeffectiveness reasons to employ the particulate supported palladium catalyst in such dehydrogenation until its conversion activity has declined at least about 20 percent as compared to its initial activity under comparable dehydrogenation conditions. Preferably, the catalyst deactivation does not exceed about 60 percent of such initial activity (as measured by conversion after about 10 hours) before the catalyst reactivation procedure of this invention is undertaken.

Characteristically, the reactivation process of this invention, when carried out using at least three solvent reactivation cycles, results in a reactivated palladium catalyst which has at least about 70 percent of the initial conversion activity of such catalyst under comparable dehydrogenation conditions.

The present invention is further illustrated by the following examples.

In the Examples 1 and 2, 1,5-dimethyltetrahydronaphthalene was dehydrogenated to 1,5-dimethylnaphthalene under liquid phase conditions using a supported palladium catalyst All procedures were conducted in a 250 ml flask fitted with condenser, an internal thermocouple, a nitrogen gas dispersion tube, and a liquid sampling port. Heating was provided by an exterior heating mantle. A weighed sample of a particulate palladium catalyst was placed in the flask along with DMT feedstock. After purging with nitrogen for a time period sufficient to remove oxygen, the flask reactor was heated to reflux while maintaining a slow purge of nitrogen through the liquid contents thereof. The reflux operation was continued for the total reaction time. Samples were withdrawn from the flask reactor to monitor conversion Withdrawn samples were analyzed by gas chromatograph, and percent conversion was calculated by the following formula:

% 1,5-DMT conversion =

$$\frac{(\% \text{ 1,5-DMT in Feed} - \% \text{ 1,5-DMT in Product})}{\text{1,5-DMT in Feed}} (100)$$

At the end of the selected reaction time, the flask was cooled to about 150°–200° C. and the liquid reaction product was removed while at this temperature. For the powdered catalyst used in Example 1, the product was removed through the glass frit of the gas dispersion tube, leaving the catalyst in the flask reactor. For the granular catalyst (an extrudate) used in Example 2, no catalyst filtration was necessary, and the product was withdrawn from the flask reactor using a syringe needle.

Catalyst reactivation using solvent washes was conducted after the reaction product had been removed from the flask. The volume of solvent used per wash was approximately equal to 30 percent of the feedstock used. The solvent was added to the flask and heated to reflux at ambient pressure. Refluxing was continued for approximately 5 minutes. The solvent was then removed in the same manner that the product had been removed. During each of the solvent washes, nitrogen was sparged through the solvent catalyst mixture at a rate of 20 ml/min. After the final solvent wash, the flask contents, i.e., the reactivated catalyst, was dried by heating the reactor to a temperature of about 120° C. under a nitrogen purge and maintaining such temperature for a time period of at least about 10 minutes.

EXAMPLE 1

Effect of Acetone Wash on a Powdered Carbon-Supported 5 Wt.-Percent Palladium Catalyst The catalyst used was a dehydrogenation catalyst containing about 5 weight percent palladium on a carbon support. The average particle size was about 15 microns.

The catalyst loading in all batches was 1 weight percent. Thus, initially 0.73 g of the catalyst and 73 g of the DMT feedstock were charged to the flask that served as the reactor. The batch operating conditions for each batch were at atmospheric reflux (about 237° C.–27020 C.). A total of nine cycles, each involving three batches having similar operating conditions except for time were carried out. The same catalyst sample was used for each successive batch. In each subsequent cycle, the same operating time was used for a given catalyst as employed in the preceding cycle. In all batches, the feedstock composition was:

|  | Wt. % |
| --- | --- |
| 1,5-DMT | 84.6 |
| Other DMTs | 4.5 |
| Xylenes | 0.7 |
| 2-pentyltoluene | 5.0 |
| DMNs | 2.6 |
| C$_{13+}$ aromatics | 0.3 |
| C$_{12}$ aromatics | 2.3 |
|  | 100.0 |

The obtained data are shown in Table I, below. These data illustrate the progressive deactivation of the catalyst for converting 1,5-dimethyltetrahydronaphthalene (1,5-DMT) to 1,5-dimethylnaphthalene (1,5-DMN). The first five batches (cycles) were made using no regeneration of the catalyst. The results in Table I further indicate that in the first cycle 98+ percent conversion was obtained after six hours of reaction. In the second cycle, only 89.7 percent conversion was obtained over 10 hours due to catalyst deactivation. The catalyst activity continued to decline over Cycles 3-5 and reached 79.4 percent in Cycle 5.

Following Cycle 5, the catalyst was treated with three successive washes of acetone ($\epsilon=20.7$;b.p.56° C.) and then dried. In the subsequent Cycle 6, the thus reactivated catalyst was much more active than in Cycle 5 and gave 94.4 percent conversion in 9.8 hours of reaction time. Thereafter, the catalyst was again treated with three successive acetone washes and then dried. In Cycle 7, the catalyst was found to be even more active than in Cycle 6 (98.1 percent conversion in 9.8 hours). Thereafter, the catalyst was again treated with two successive acetone washes and then dried. In Cycle 8, the yield was found to be 94.7 percent conversion Thereafter, the catalyst was again treated with three successive acetone washes followed by one wash of methanol ($\epsilon=32.6$;b.p.65° C.) In a subsequent Cycle 9, the catalyst conversion activity was 96.8 percent.

The results are shown graphically in FIG. 1 which is based on Table I.

Thus, the use of the catalyst reactivation procedure allowed use of the same batch of catalyst for 9 cycles with relatively high catalytic activity still remaining during the 9th cycle.

EXAMPLE 2

Effect of Acetone Wash on a Granular $Al_2O_3$-Supported 1% Palladium Catalyst

The catalyst used was a granular, 1/16-inch extrudate (Engelhard Catalog No. 2264 102) and was comprised of 1 weight percent palladium supported on alumina ($Al_2O_3$).

The catalyst loading in all batches was 5 weight percent. Thus, initially, 3.6 g of the catalyst and 73 g of the feedstock were charged to a round bottom flask that served as the reactor. The batch operating conditions for each batch were reflux conditions (237° C. to 270° C. at about one atmosphere pressure). The same catalyst was used for all batches. In all batches the feedstock composition was:

|  | Wt. % |
| --- | --- |
| 1,5-DMT | 81.6 |
| Other DMTs | 4.3 |
| Xylenes | 0.7 |
| 2-pentyltoluene | 4.8 |
| DMNs | 2.6 |
| $C_{13+}$ aromatics | 4.1 |
| $C_{12}$ aromatics | 1.9 |
|  | 100.0 |

Data in Table II, below, illustrate the deactivation and reactivation of the palladium/alumina extrudate catalyst for the dehydrogenation of 1,5-DMT to 5-DMN. The first three cycles used no catalyst reactivation step. As a result, a slow decline in activity from

TABLE I

| EFFECT OF ACETONE WASH ON DEACTIVATED 5% Pd/CARBON POWDER CATALYST ||||||||
| Catalyst Wash Before Cycle | Cycle | Sample | Hours | Feedstock || Product || % Conversion |
| | | | | 1,5-DMT | 1,5-DMN | 1,5-DMT | 1,5-DMN | |
| None | | | | 84.6 | 2.3 | | | |
| | 1 | 1 | 1 | | | 5.78 | 80.9 | 93.17 |
| | 1 | 2 | 4 | | | 1.27 | 87.3 | 98.50 |
| | 1 | 3 | 6 | | | 1.23 | 87.4 | 98.55 |
| None | | | | 84.6 | 2.3 | | | |
| | 2 | 4 | 1 | | | 37.7 | 50 | 55.4 |
| | 2 | 5 | 5.3 | | | 9.53 | 79.2 | 88.74 |
| | 2 | 6 | 9.8 | | | 8.71 | 79.7 | 89.70 |
| None | | | | 83.4 | 2.3 | | | |
| | 3 | 7 | 1 | | | 49.4 | 38 | 40.77 |
| | 3 | 8 | 4 | | | 19.2 | 69.7 | 76.98 |
| | 3 | 9 | 9.8 | | | 11.98 | 76.4 | 85.64 |
| None | | | | 83.4 | 2.3 | | | |
| | 4 | 10 | 1 | | | 49.3 | 37.9 | 40.89 |
| | 4 | 11 | 4 | | | 18.7 | 69.8 | 77.58 |
| | 4 | 12 | 9.8 | | | 12 | 76.6 | 85.61 |
| None | | | | 83.4 | 2.3 | | | |
| | 5 | 13 | 1 | | | 52.5 | 35 | 37.05 |
| | 5 | 14 | 4 | | | 26.1 | 61.2 | 68.71 |
| | 5 | 15 | 9.8 | | | 17.2 | 71.1 | 79.38 |
| 3 Acetone Washes | | | | 85.0 | 2.1 | | | |
| | 6 | 17 | 1 | | | 54.7 | 32.5 | 35.62 |
| | 6 | 18 | 4 | | | 19.07 | 67.5 | 77.56 |
| | 6 | 19 | 9.8 | | | 4.78 | 83.8 | 94.37 |
| 3 Acetone Washes | | | | 85.0 | 2.1 | | | |
| | 7 | 22 | 1 | | | 50.33 | 37.3 | 40.77 |
| | 7 | 23 | 4 | | | 12.83 | 75.2 | 84.90 |
| | 7 | 24 | 9.8 | | | 1.58 | 86.8 | 98.14 |
| 2 Acetone Washes | | | | 85.0 | 2.1 | | | |
| | 8 | 26 | 1 | | | 59.6 | 28 | 29.86 |
| | 8 | 27 | 4 | | | 25.1 | 62.8 | 70.46 |
| | 8 | 28 | 9.8 | | | 4.47 | 83.6 | 94.74 |
| 3 Acetone +1 Methanol Wash | | | | 85.0 | 2.1 | | | |
| | 9 | 30 | 1 | | | 47.6 | 40.2 | 43.98 |
| | | 31 | 4 | | | 14.8 | 73.4 | 82.58 |
| | 9 | 32 | 9.8 | | | 2.72 | 85.8 | 96.80 |

99.6% to 97.2% conversion was observed over the three cycles.

Following Cycle 3, the catalyst was heated to reflux with the product of Cycle 3 for 41 hours to further deactivate intentionally the catalyst without any other treatment before Cycle 4 was carried out.

The effectiveness of the indicated deactivation procedure for the catalyst was demonstrated in Cycle 4 which yielded only 46.5% conversion in 9.75 hours. Following Cycle 4, and before each of the succeeding Cycles 5 and 6, the catalyst was reactivated by washing three times with acetone in the manner described in Example 1. The resultant catalyst was highly active and yielded activity similar to that of the fresh catalyst.

Figure 2:
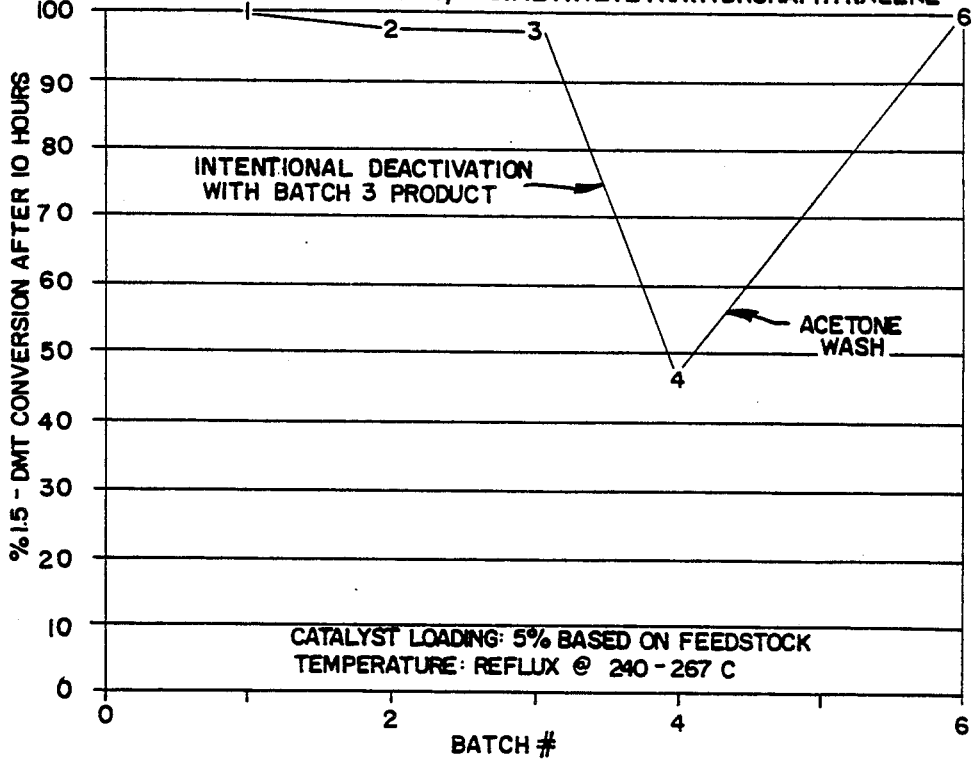
FIG. 2 is a graphical representation of regeneration of a 1-weight percent palladium catalyst supported on alumina and used to dehydrogenate batches of 1,5-dimethyltetrahydronaphthalene to 1,5-dimethylnaphthalene with attendant intentional catalyst deactivation.

The experimental results are shown graphically in FIG. 2 which is based on Table II.

TABLE II

EFFECT OF ACETONE WASH ON DEACTIVATED 1% Pd/ALUMINA GRANULAR CATALYST

| Catalyst Wash Before Cycle | Cycle | Sample # | Hours | 1.5-DMT | 1.5 DMN | % Conversion |
|---|---|---|---|---|---|---|
| None | 1 | 3 | 9.75 | 0.3 | 82.9 | 99.6 |
| None | 2 | 4 | 9.75 | 2 | 81.6 | 97.5 |
| None | 3 | 6 | 9.75 | 2.3 | 80.8 | 97.2 |
|  | 4 | 10 | 9.75 | 43.7 | 38.5 | 46.5 |
|  | 5* | N/A | N/A | N/A | N/A | N/A |
|  | 6 | 17 | 9.75 | 0 | 82.9 | 100.0 |

*Aborted run; product lost

Although the present invention has been described and illustrated based on the presently available information and embodiments, it is to be understood that modifications and variations are within the spirit and scope of the invention, as those skilled in the art will readily appreciate and that such are within the purview and scope of the appended claims.

We claim:

1. A process for reactivating a deactivated supported palladium catalyst used in the dehydrogenation of dimethyltertrahydronapthalenes to dimethylnapthalenes comprising contacting the catalyst with an organic polar solvent for naphthalenic compounds at a temperature below about 200° C. for a time period sufficient to increase the catalytic activity of the catalyst; said organic polar solvent having a dielectric constant at 25° C. in the range of about 4 to about 80 and a boiling point at atmospheric pressure in the range of about 30° C. to about 230° C.

2. The process of claim 1 wherein said polar solvent is an aliphatic ketone containing 3 to 10 carbon atoms, inclusive.

3. The process of claim 2 wherein said ketone is acetone.

4. The process of claim 1 wherein said polar solvent is a monohydric aliphatic alcohol containing 1 to 4 carbon atoms, inclusive.

5. The process of claim 4 wherein said alcohol is methanol.

6. The process of claim 1 wherein said polar solvent comprises a mixture of an aliphatic $C_3$ to $C_{10}$ ketone with a monohydric $C_1$ to $C_{10}$ aliphatic alcohol.

7. The process of claim 6 wherein said mixture is comprised of methanol and acetone.

8. The process in accordance with claim 1 wherein said polar solvent is an ether.

9. The process in accordance with claim 1 wherein said polar solvent is a carboxylic acid ester.

10. The process in accordance with claim 1 wherein said polar solvent is a halogenated hydrocarbon.

11. The process of claim 1 wherein contacting is carried out while an admixture of the solvent and the catalyst is maintained at reflux.

12. The process of claim 11 wherein during said reflux, an inert gas is sparged through the admixture of said catalyst and said solvent.

13. The process of claim 12 wherein said inert gas is nitrogen.

14. The process of claim 11 wherein, plural cycles of reflux with fresh solvent for each cycle are carried out.

15. The process of claim 1 wherein, after said solvent is removed from said reactor after said contacting, the catalyst is dried.

16. The process of claim 15 wherein said drying is carried out under an inert gas purge.

17. The process of claim 16 wherein said inert gas is nitrogen.

* * * * *

UNITED STATES PATENT OFFICE
CERTIFICATE OF CORRECTION

Patent No. 4,999,326  Dated March 12, 1991

Inventor(s) David L. Sikkenga; Ian C. Zaenger, and Gregory S. Williams

It is certified that error appears in the above-identified patent and that said Letters Patent is hereby corrected as shown below:

| Col. | Line | |
|---|---|---|
| 1 | 53 | "3020 C" should read --30°C-- |
| 1 | 60 | "bed Thus" should read --bed.  Thus-- |
| 2 | 45 | "40020 C" should read --400°C-- |
| 2 | 64 | "20020 C" should read --200°C-- |
| 3 | 39 | "3020 C" should read --30°C-- |
| 4 | 21 | "oammabutyrolactone" should read --gamma-butyrolactone-- |
| 4 | 64 | "20020 C" should read -200°C-- |
| 4 | 67 | "20020 C" should read --200°C-- |
| 5 | 32 | "costeffectiveness: should read --cost effectiveness-- |
| 5 | 53 | "catalyst" should read --catalyst.-- |
| 5 | 65 | "conversion" should read --conversion.-- |
| 6 | 44-45 | "27020 C" should read --270°C-- |
| 7 | 18-19 | "conversion Thereafter" should read --conversion.  Thereafter-- |
| 8 | 30-31 | "5-DMN" should read --1,5-DMN-- |
| 9 | 22 (Table II) | "1.5-DMT 1.5 DMN" should read --1,5-DMT 1,5-DMN-- |

Signed and Sealed this

First Day of September, 1992

Attest:

DOUGLAS B. COMER

Attesting Officer

Acting Commissioner of Patents and Trademarks